April 25, 1967
J. C. VITTONE
3,315,952
AUTOMOTIVE STABILIZER BAR
Filed May 12, 1965
2 Sheets-Sheet 1
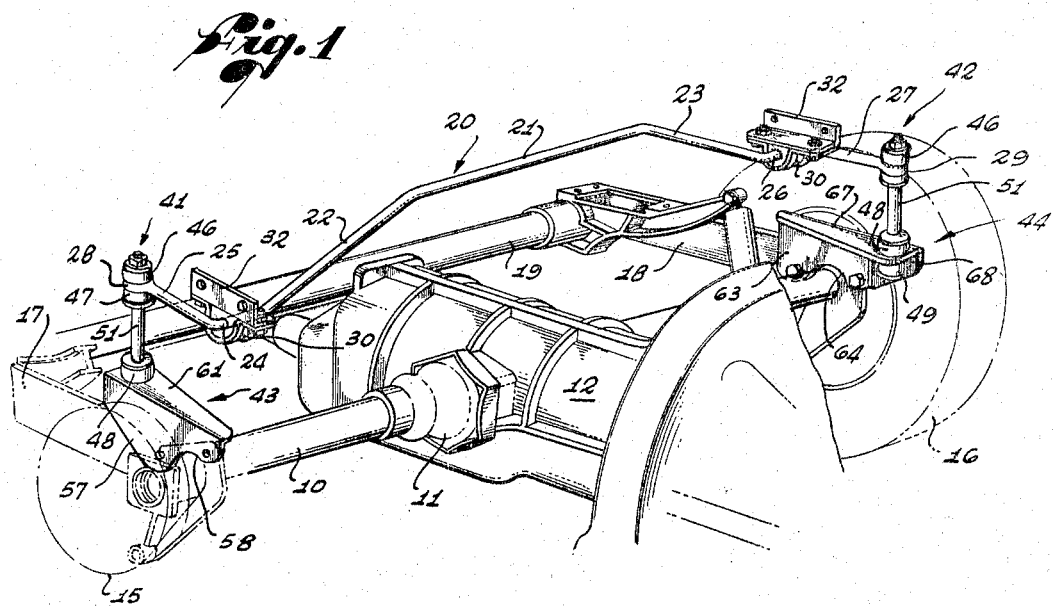
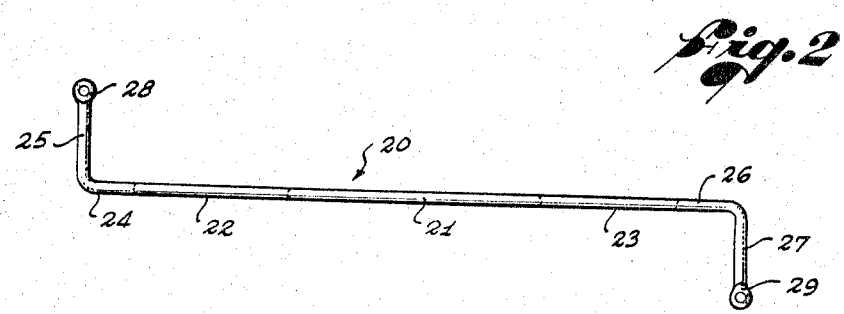
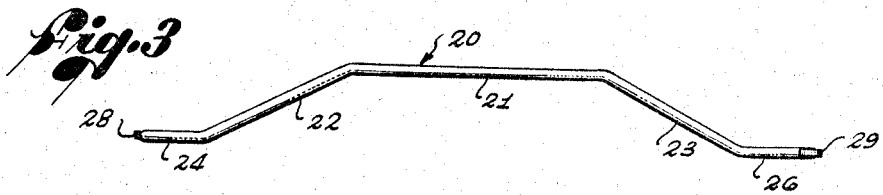
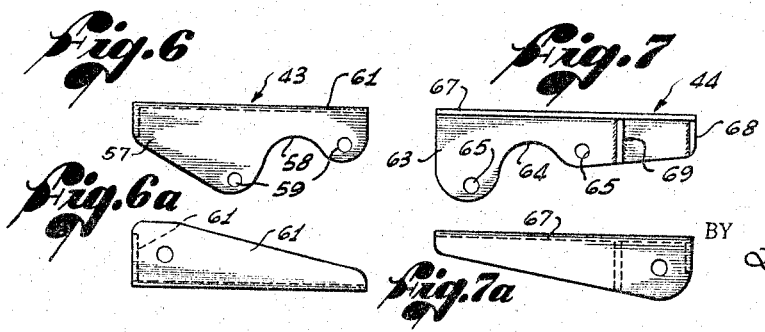
INVENTOR.
JOSEPH C. VITTONE
BY
Forrest J. Lilly
ATTORNEY April 25, 1967  J. C. VITTONE  3,315,952
AUTOMOTIVE STABILIZER BAR
Filed May 12, 1965  2 Sheets-Sheet 2
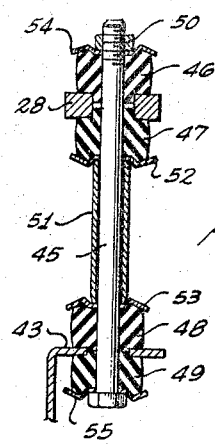
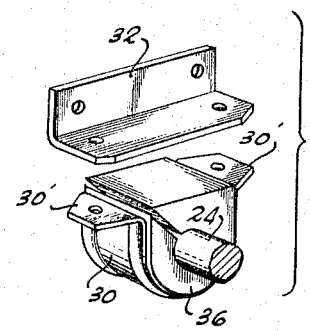
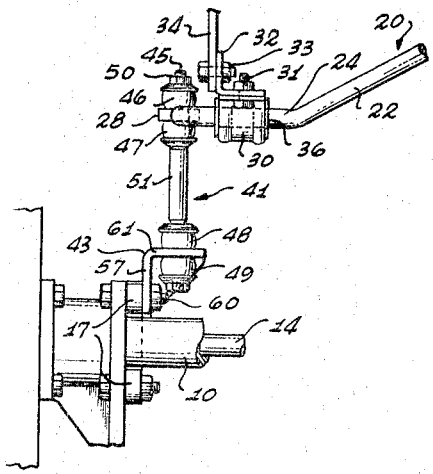
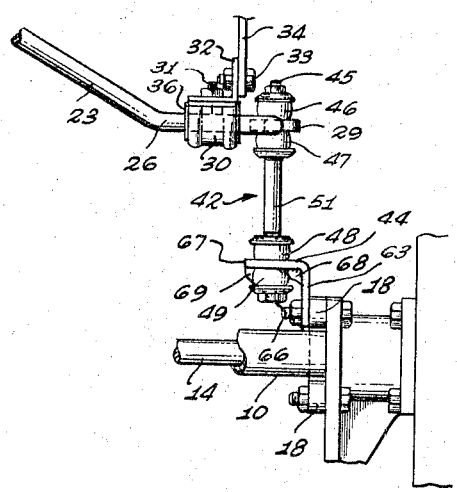
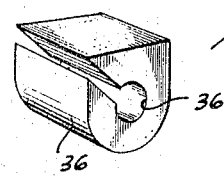
INVENTOR.
JOSEPH C. VITTONE
BY Forrest J. Lilly
ATTORNEY

United States Patent Office 3,315,952
Patented Apr. 25, 1967

3,315,952
AUTOMOTIVE STABILIZER BAR
Joseph C. Vittone, Riverside, Calif., assignor to European Motor Products, Inc., Riverside, Calif., a corporation of California
Filed May 12, 1965, Ser. No. 455,256
9 Claims. (Cl. 267—11)

This invention relates to stabilizers for automobiles and, more particularly, to an improved anti-sway or stabilizer bar for swing-axle automobiles.

More specifically, this invention is directed to a stabilizer bar of rigid construction, as opposed to flexible types made in the form of a flat leaf spring. Such a flat spring type bar is secured at its ends to the axle housings near the wheels, and normally extends under the axle housings and transmission case, and is held near its mid point by a bracket which is secured to the transmission case. In so locating a stabilizer bar, it is necessarily in an exposed position in which it can be damaged by objects on the road. Also, in certain cars, its mid portion is directly beneath the oil drain plug in the transmission case, and certain forms of such stabilizer bars require that they be removed in order to drain oil from the transmission case.

It is an object of my invention to provide a stabilizer bar for swing-axle automobiles which is positioned well above the roadway so that it cannot be damaged.

It is another object of this invention to provide an improved stabilizer bar for swing-axle automobiles which, although coupled at its ends to the axle housings, does not lie in the path of any parts to which access must be had for servicing and maintenance of the automobile.

Other objects relate to the form, positioning and support for the stabilizer bar, and also the mountings for the ends of the bar, and will become evident in the course of the following detailed description in conjunction with the accompanying drawings of an illustrative embodiment thereof, in which:

FIG. 1 is a perspective view of a portion of a conventional swing-axle automobile, looking forwardly from a position back of the left rear wheel, showing the stabilizer bar of the invention as a rigid element extending above the transmission case, and with the ends thereof carried on vertically oriented mountings which are in fixed spaced relation to the axle housings;

FIG. 2 is a top plan view of the stabilizer bar, showing the oppositely directed end portions thereof;

FIG. 3 is a front elevation view of the stabilizer bar;

FIG. 4 is an enlarged sectional view of one of the mountings for the stabilizer bar, showing the end of the bar and the bracket of the mounting supported between spaced pairs of rubber blocks;

FIG. 5 is a fragmentary front elevation view of the stabilizer bar with the mountings on the arms thereof, and with the brackets of the mountings fixed adjacent the ends of the axle housings, and showing the supports in which the ends of the center portion of the bar are supported for pivotal movement;

FIGS. 6 and 6a are respective side elevation and top plan views of the bracket used for the mounting on the left side of the automobile;

FIGS. 7 and 7a are respective side elevation and top plan views of the bracket used for the right side of the automobile;

FIG. 8 is an exploded view of the parts of one of the supports in which the stabilizer bar is held for pivotal movement; and FIG. 9 is an enlarged perspective view of the frictional gripping member of the support of FIG. 8.

Referring to FIG. 1, there is shown a portion of the rear end of a typical swing-axle automobile in which each axle housing 10 is joined, as indicated at 11, to the side of the transmission case 12. In typical fashion, the axle housings on the opposite sides of the transmission case are in alignment, and provisions are made for their swinging on pivot axes relative to the transmission case. The axle housings 10 will be understood to contain the usual swing axles 14 (FIG. 5), with the usual universal pivot couplings to the transmission inside the case 12. The outer ends of the axles are connected to the hubs 15 on which the wheels 16 are mounted, all in a conventional fashion. Also shown are the usual radius arms 17, 18 extending from the outer ends of the axle housings 10, and which are connected at their forward ends to the torque tube tunnel 19.

The stabilizer or anti-sway bar is designated by the numeral 20. Referring to FIGS. 1–3, the bar 20 is formed of a substantially rigid rod of sufficient size to resist lateral bending (e.g., ¾ inch diameter metal stock), formed with bends therein so that it has an elongated center section 21 located above and spanning the transmission case 12, and with outwardly and downwardly extending legs 22, 23 of equal length terminating in coplanar L-shaped ends 24-25 and 26-27 wherein the legs 24, 26 are coaxial and the terminal legs extend longitudinally of the automobile. The terminal legs 25, 27 extend in opposite directions, as with the terminal leg 25 on the left side extending forwardly and the terminal leg 27 extending rearwardly. As shown, the outer ends of the terminal legs 25, 27 are formed with eyelets 28, 29.

The coaxial legs 24, 26 of the bar 20 are supported for pivotal movement on their axis. To this end, and referring to FIGS. 1, 5 and 8, each of the coaxial legs 24, 26 is held in a U-shaped strap 30 that has tabs 30' secured, as at 31, to an angle plate 32, which, in turn, is secured (FIG. 5) at 33 to available portions 34 of the body of the automobile. The body portions 34 may, for example, be constituted of portions of the body directly below the compartment that is located behind the rear seat.

The coaxial legs 24, 26 of the stabilizer bar extend through frictionally engaging rubber elements 36 (FIGS. 8 and 9). As shown for the leg 24, the element 36 is formed of a split rubber piece having an arcuate surface 36' which is placed around the leg 24 of the bar. The size of the element 36 is such that its inner surface 36' does not completely encircle the bar when the strap 30 is slipped over the element. Rather, the size of the element 36 is such that upon securing the angle plate 32 to the tabs 30', the element 36 is compressed to bring its ends together and completely encircle the bar. The element 36 thus tightly and frictionally engages the bar.

With the stabilizer bar thus engaged and held, it can be seen that if an upward force is applied to either of its terminal legs, e.g., the terminal leg 25, such force is transmitted through the bar 20 to urge the other terminal leg 27 downwardly. If the upward force on the terminal leg 25 is sufficient to overcome the frictional engagements of the elements 36 with the coaxial legs 24 and 26, the bar undergoes angular movement on the axis of the legs 24, 26, whereby the other terminal leg 27 moves downwardly.

It is this action of the stabilizer bar 20 which is utilized to obtain the desired stability. To this end, the terminal legs 25, 27 are carried on the upper ends of mountings 41, 42 which are held at their lower ends adjacent the axle housings 10, as by brackets 43, 44. Each of the mountings 41, 42 (see FIG. 4) includes an elongated bolt 45 which passes through the eyelet 28 of the stabilizer bar and the horizontal side of the bracket 43. The bolt also extends through rubber blocks 46, 47 which engage the upper and lower surfaces of the eyelet 28, and rubber blocks 48, 49 which engage the opposite surfaces of the horizontal side of the bracket 43 through which the bolt 45 extends. As shown, the confronting faces of the rubber blocks are formed with axial projections which extend into the openings in the eyelet 28 and the bracket 43.

Upon tightening a nut 50 on the threaded end of the bolt 45, the rubber blocks 46, 47 are compressed tightly against the eyelet 28, and the blocks 48, 49 are compressed against the bracket 43. For this purpose, a short sleeve 51 is placed around the shank of the bolt 45 and extends between the rubber blocks 47, 48. At its ends, the sleeve 51 engages washer-like elements 52, 53 which engage the rubber blocks 47, 48. Similar washer-type elements 54, 55 are located on the upper end of the top rubber block 46 and on the lower end of the bottom rubbes block 49.

A suitable shape for the bracket 43 is shown in FIGS. 6 and 6a. The bracket has a vertical wall 57 which has a cut-out portion on its lower edge, indicated at 58, to be placed against the axle housing, and which is provided with openings 59 through which it is bolted, as at 60 in FIG. 5, to the radius arm 17. The mounting 41 is secured at its lower end to the forward end of the horizontal wall 61 of the bracket. The forward end of the bracket is reinforced by a web portion 62 extending between the ends of the walls 57, 61.

The bracket 44 (FIGS. 7 and 7a) also has a vertical wall 63 with a cut-out 64 to fit the axle housing, and with openings 65 through which it is bolted, as at 66 in FIG. 5, to the radius arm 18. The bracket 44 extends rearwardly a sufficient distance so the mounting 42 can be secured to its horizontal wall 67. A reinforcing web 68 extends between the ends of the walls 63, 67. For greater strength, the bracket may be formed with additional reinforcing webs, as indicated at 69 in FIGS. 7 and 7a. Of course, the other bracket may similarly be formed for greater strength.

With the stabilizer bar and its mountings secured to the automobile as above described, it will be seen that an upward force applied to either mounting is transmitted through the stabilizer bar and reflected as a downward force applied to the other mounting. Thus, if the wheel associated with the mounting 41 tends to leave the road during a turn, the resulting lifting force on the mounting 41 is reflected in a downward force on the mounting 42 applied to the axle housing 10 adjacent its associated wheel. However, since the wheel associated with the mounting 42 is still in firm contact with the road, such downward force (and corresponding angular movement of the stabilizer bar 20) is resisted. Thus, the opposing force against the mounting 42 acts through the stabilizer bar 20 to offset the tendency of the opposite wheel to lift off the road.

Additional resistance is provided by the pivotal supports for the stabilizer bar. Since the elements 36 firmly grip the coaxial legs 24, 26, they cooperate to resist pivotal movement of the bar.

Still further, the rubber elements 36, as well as the rubber blocks 46, 47 and 48, 49 of the mountings, constitute effective shock absorbing members.

With the unique stabilizer bar construction of my invention, it will be seen that all portions of the bar are located at substantial distances from the roadway, so that there is minimum danger of damage to any portions of the bar from objects on the road.

The drawings and description are illustrative of a present preferred embodiment of the invention, and it will be understood that various changes in design, structure and arrangement may be made without departing from the spirit and scope of the appended claims.

I claim:
1. Stabilizer apparatus for a swing-axle automobile wherein axle housings extend from opposite sides of a transmission case, comprising:
   a rigid rod having a mid-portion to be positioned above the transmission case, said rod having terminal leg portions extending in opposite directions from the rod;
   means for supporting said terminal legs in fixed spaced relation with the axle housings; and
   means for supporting said rod for angular movement about its axis.

2. The subject matter of claim 1, wherein said terminal legs extend from straight coaxial sections of said rod, and the mid-portion of said rod to be positioned above the transmission case is parallel to said coaxial sections.

3. The subject matter of claim 2, wherein said mid-portion of said rod is centered between said coaxial sections, whereby the portions of the rod connecting the adjacent ends of said mid-portion and coaxial sections are of equal length.

4. The subject matter of claim 3, wherein said terminal legs are at right angles to said coaxial sections.

5. The subject matter of claim 4, wherein said means for supporting said rod for angular movement include respective elements of resilient material surrounding said coaxial sections; and means compressing said elements into firm frictional engagement with said coaxial sections, said means being adapted to be secured to the body of the automobile.

6. The subject matter of claim 5, wherein the ends of said terminal legs are formed with eyelets, and wherein said means for supporting said terminal legs include, for each terminal leg, a bolt threaded at one end and extending through said eyelet; a respective plate to be secured in a horizontal position and fixed with respect to each axle housing and having an opening through which the bolt extends; a first pair of rubber elements on each bolt abutting the opposite sides of the eyelet and having portions extending into the eyelet opening; a second pair of rubber elements on each bolt abutting each side of the plate and having portions extending into the opening thereof; a sleeve on each bolt extending between the adjacent rubber elements thereon; and a threaded nut on the threaded end of each bolt, said nut being tightened to compress the rubber elements of the first pair against the eyelet and the rubber elements of the second pair against the plate.

7. In a swing-axle automobile having rear swing axles on axle housings extending outward from a transmission case to the wheels, stabilizer means comprising:
   a rigid metal rod having a mid-section located above and spanning the transmission case, the axes of said mid-section and the axles lying in a vertical plane, said rod having sections extending outwardly and downwardly from the ends of said mid-section, said rod having horizontal coaxial sections extending outwardly from the lower ends of said outwardly and downwardly extending sections, said rod having horizontal terminal legs extending at right angles to said coaxial sections, the outer ends of said coaxial sections being located above and near the wheel ends of the axle housings, one terminal leg extending forwardly and the other terminal leg extending rearwardly from the rod;
   means attached to the coaxial sections of said rod to permit angular movement of the rod about their axis;
   respective vertical mounting means extending downwardly from the ends of said terminal legs; and support plates securing the lower ends of said mounting means in fixed spaced relation to the axle housings.

8. The subject matter of claim 7, wherein said means attached to the coaxial sections of said rod include a rubber element compressed into firm frictional engagement therewith.

9. The subject matter of claim 7, wherein each mounting means includes two pairs of rubber elements, the end of the terminal leg being located between the rubber elements of one pair, the support plate being located between the rubber elements of the other pair; and means compressing the rubber elements of the one pair against the terminal leg and the rubber elements of the other pair against the support plate.

No references cited.

EUGENE G. BOTZ, *Primary Examiner.*

R. M. WOHLFARTH, *Assistant Examiner.*